Figure 1:
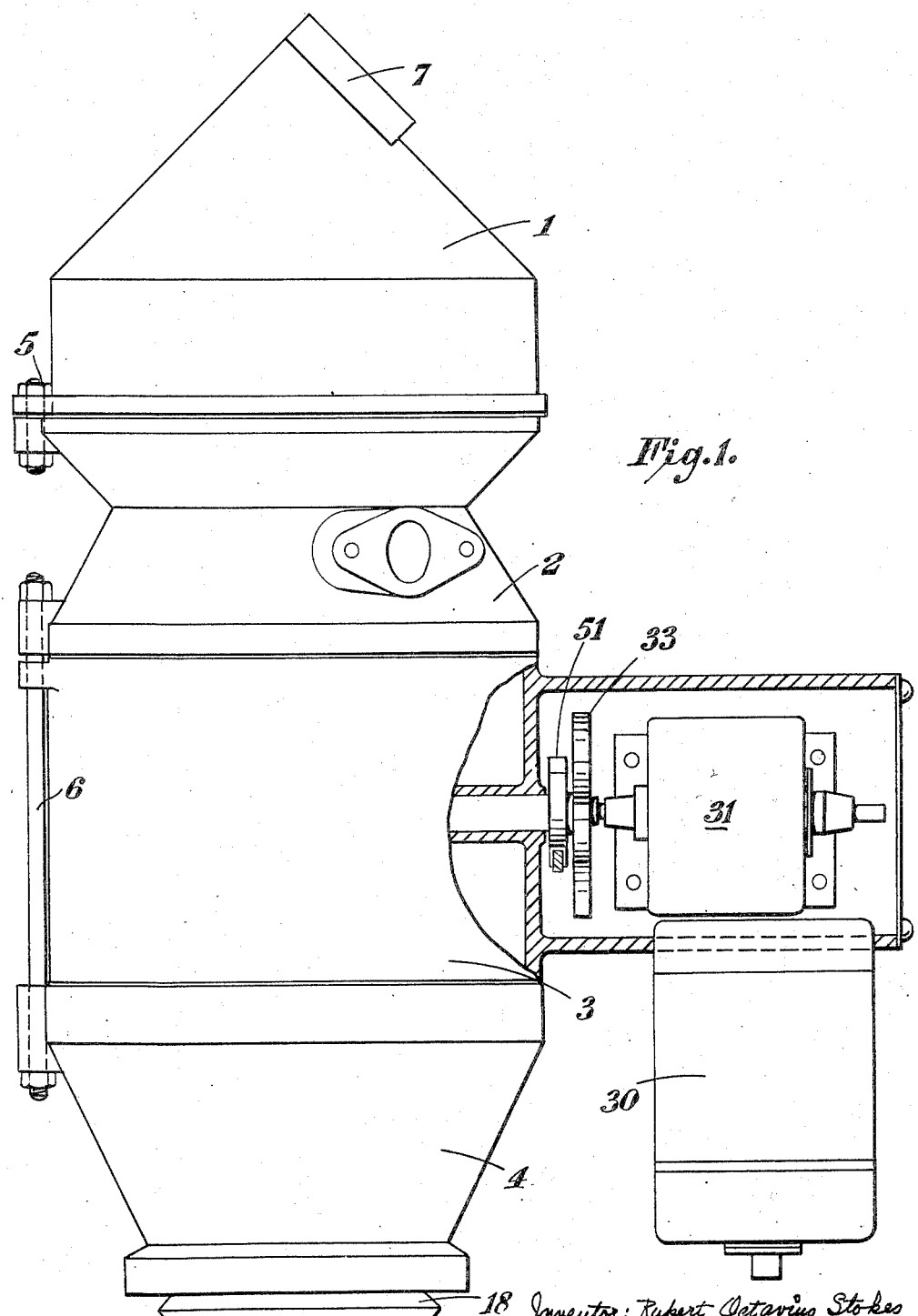

Dec. 24, 1957  R. O. STOKES  2,817,463
VALVE ARRANGEMENT FOR THE DISCHARGE OF MATERIAL
FROM A SPACE BELOW ATMOSPHERIC
PRESSURE AND LIKE PURPOSES
Filed May 13, 1955  5 Sheets-Sheet 4

Inventor:
Rupert Octavius Stokes
By his attorneys:
Baldwin & Wight

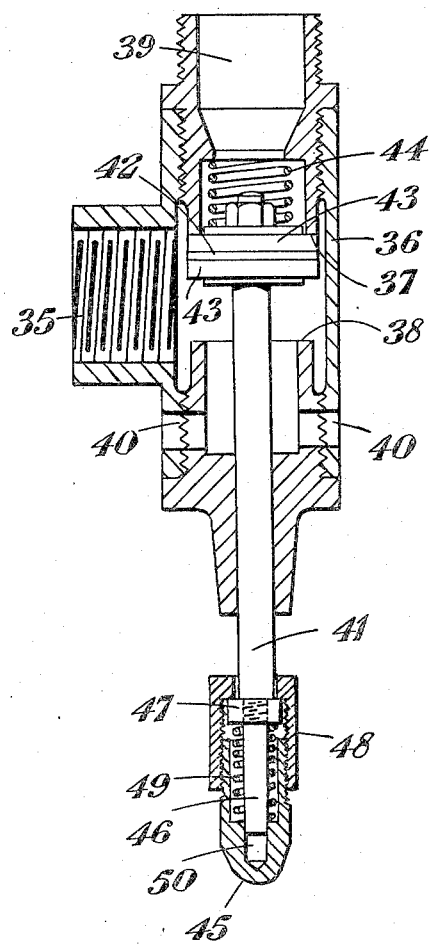

United States Patent Office 2,817,463
Patented Dec. 24, 1957

2,817,463

VALVE ARRANGEMENT FOR THE DISCHARGE OF MATERIAL FROM A SPACE BELOW ATMOSPHERIC PRESSURE AND LIKE PURPOSES

Rupert Octavius Stokes, London Wall, England

Application May 13, 1955, Serial No. 508,276

6 Claims. (Cl. 222—442)

The invention relates primarily to a valve arrangement for the discharge of loose material from a space maintained below atmospheric pressure. A chamber valve has been used for this purpose, in which six or some other number of chambers of a wheel are brought alternately into communication with the lower end of the discharge space and with an outlet to the atmosphere, each chamber never being in communication simultaneously with both spaces. Many materials, however, are of a gritty nature and are, therefore, liable to cause undue wear on the rubbing surfaces of the valve.

A discharge valve arrangement of the kind envisaged is required for all cases in which granular, pulverulent or other loose material is to be discharged from one space to another space at a different pressure, such as from a pneumatic elevator or conveyor or from a cyclone.

For the purpose of the present description and the claims the space from which the material is to be removed and which in most applications is maintained at a pressure below atmospheric, will be termed the vacuum space.

According to the invention a valve arrangement for the discharge of granular or pulverulent material from a vacuum space to atmosphere adapted to be applied to a bottom outlet of the vacuum space comprises an air lock through which the material is discharged, the air lock having two valves opened in alternation but each being closed before the other is opened, and a snifting valve is provided to equalise the air pressure in the air lock before either of the aforementioned valves is opened, so that there is no air flow past either of the said valves to impede the flow of material being discharged.

In the preferred form of construction the valve arrangement comprises a housing adapted to be fixed in a substantially air tight manner to the bottom outlet of the vacuum space and also having a bottom outlet, an inlet valve at the upper part of the housing to establish communication for the material when open between the vacuum space and the space within the housing, an outlet valve at the lower part of the housing to establish communication for the material when open between the space within the housing and atmosphere, a snifting valve to connect the space within the housing alternately to the vacuum space and to atmosphere for the flow of air according to its position, and operating means for the inlet, outlet and snifting valves whereby the inlet and outlet valves are opened and closed in alternation with a period of time after each of the said valves is closed and before the other is opened and the snifting valve sets the space inside the housing during each such period into communication with the space beyond that of the other two valves which is about to open.

Figure 2:
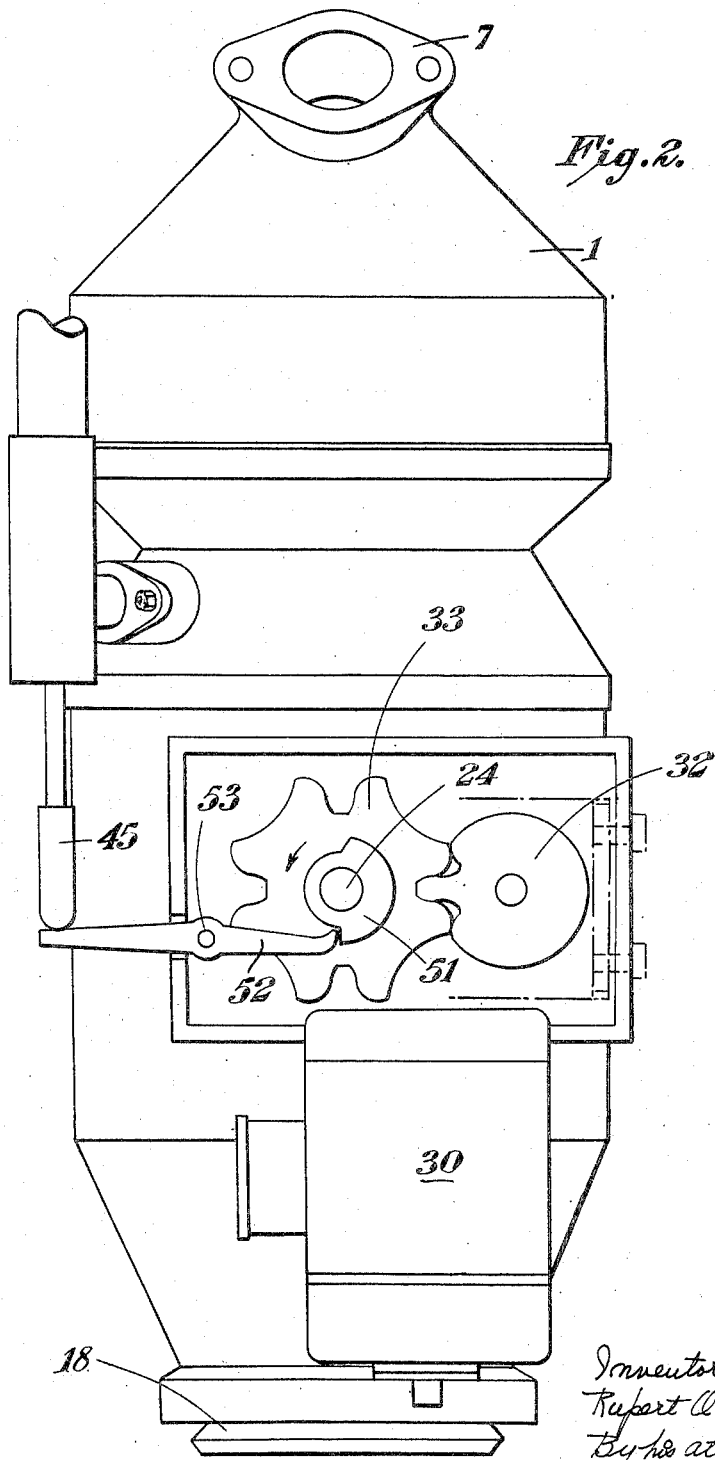
Figure 3:
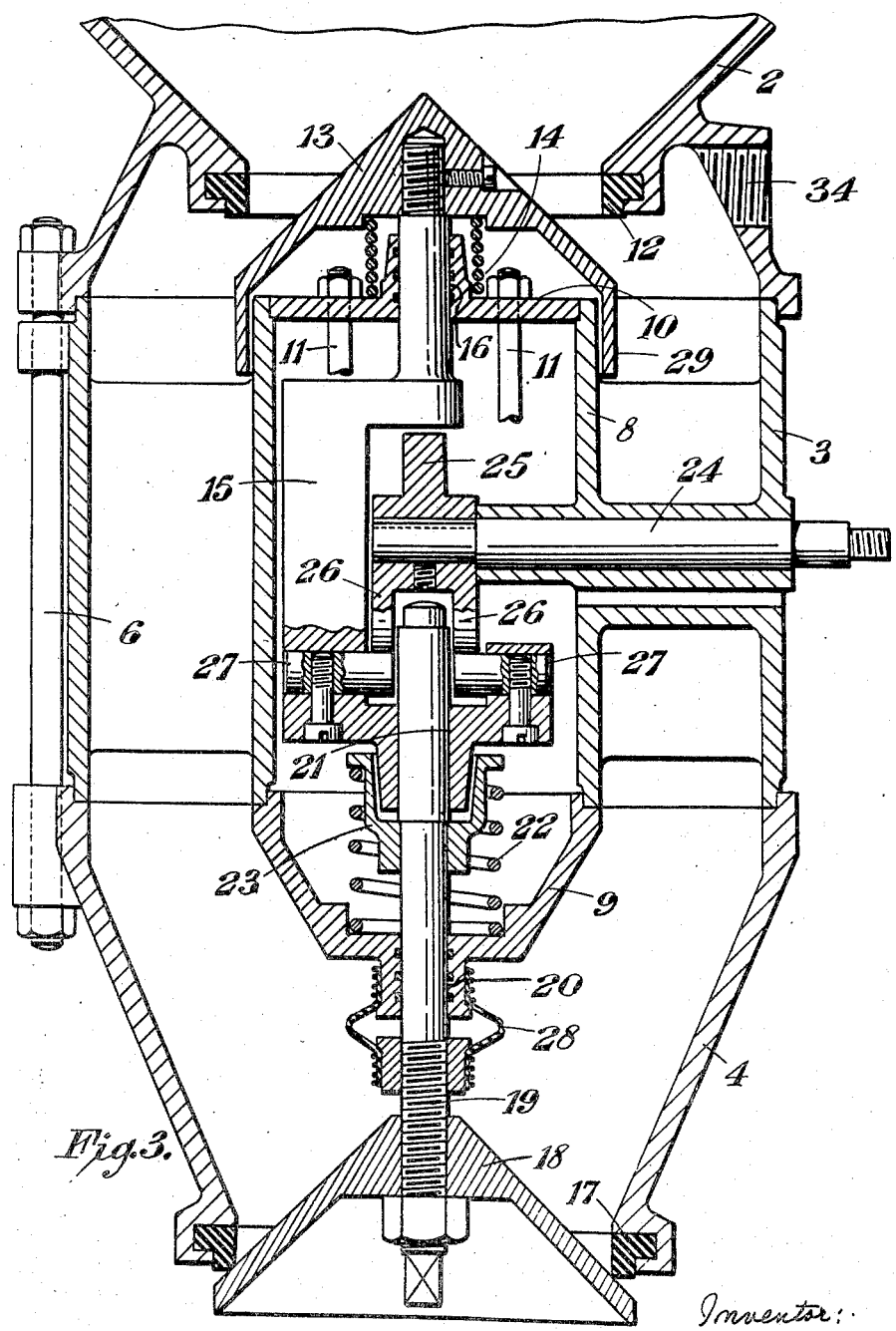
Figure 4:
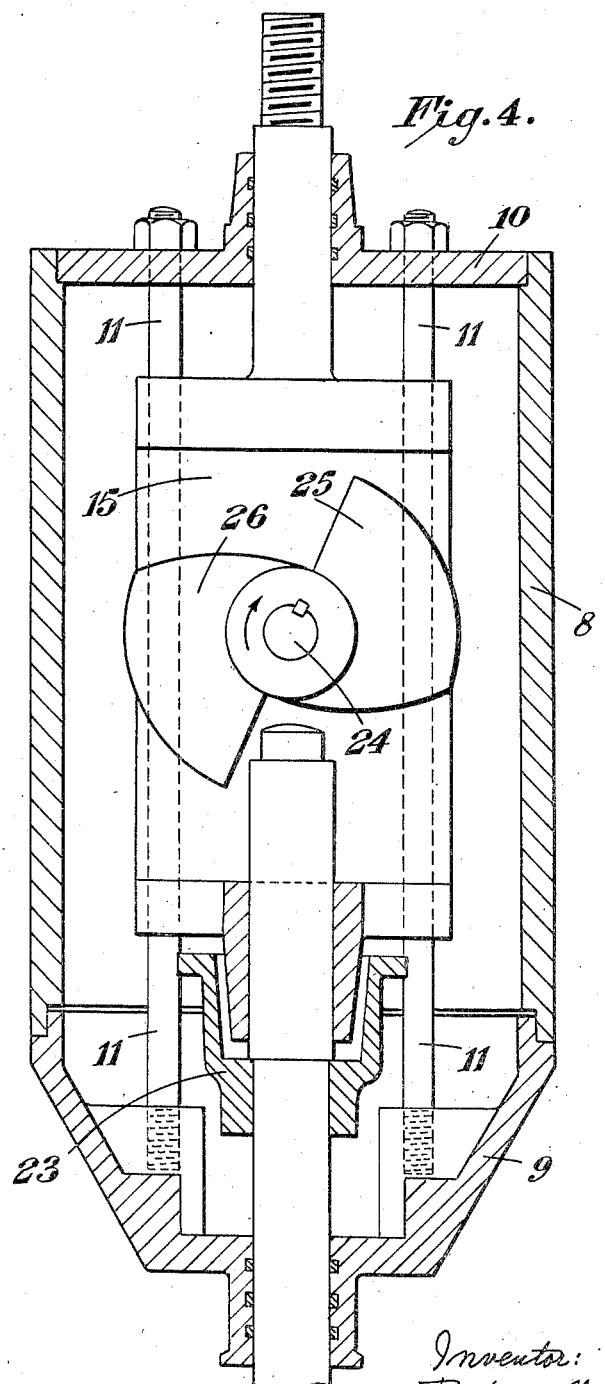

The invention is illustrated by a valve arrangement shown in the accompanying drawings by way of example, in which Figure 1 is an elevation of the valve arrangement partly in section, Figure 2 is an elevation taken at right angles to the view of Figure 1 with certain parts removed, Figure 3 is a sectional elevation corresponding to Figure 1, Figure 4 is a part sectional elevation corresponding to Figure 2, but taken in the opposite direction, and Figure 5 is a sectional elevation of the snifting valve.

Referring to the drawings, the valve arrangement comprises a housing in four parts, 1, 2, 3 and 4 held together by four sets of bolts placed at 45° in plan in relation to the directions in which the elevations of Figures 1 to 4 are taken. The bolts are shown conventionally at 5 and 6 in Figure 1 and at 6 in Figure 3 out of their true position. The vessel from which the material is to be discharged is connected to the housing part 1 by a flange 7 and will be regarded in the present instance as being under vacuum, while the discharge is to take place into the free air.

The part 3 of the housing has an inner cylindrical member 8 attached to it but spaced from the outside, so that the material to be discharged can fall through the annular space between the members 3 and 8. Part 4 of the housing also has an inner member 9 to constitute a bottom closure for the member 8. The top closure of the member 8 is in the form of a flat plate 10, the parts 9 and 10 being held against the lower and upper ends respectively of the member 8 by four bolts 11. The combination of parts 8, 9 and 10 may be referred to as the valve body.

An inlet valve for the material into part 2 comprises a valve seating 12 in the form of a ring of resilient material and a conical valve member 13 urged upwards into contact with the ring 12 by a coil spring 14, of which the lower end is supported by the plate 10. The valve member 13 is fixed by screw threads to the top end of a yoke 15, which passes by a gland 16 through the plate 10.

An outlet valve at the lower end of the housing part 4 comprises a ring 17 of resilient material to constitute a valve seating and a conical valve member 18 fixed at the lower end of a rod 19 which passes by a gland 20 through the bottom part 9 of the body. The rod 19 is guided by its upper part in a bore 21 at the lower part of the yoke 15, the combination of the yoke 15 and rod 19 thus being located in the glands 16 and 20 so as to be capable of axial movement only.

The rod 19 is urged upwards by a coil spring 22, which rests against the bottom of the part 9 and against the flange on a cap member 23 attached to the rod 19. Thus the outlet valve is normally urged into the closed position as well as the inlet valve.

A horizontal shaft 24 journaled in housing part 3 and cylindrical member 8 carries a single cam 25 which during the rotation of the shaft 24 makes contact with the upper end of the rod 19, thereby depressing the latter to open the outlet valve 18 against the force of the spring 22. A pair of cams 26, of a similar shape to the cam 25, can likewise make contact with pins 27 fixed by screws in the lower part of the yoke 15, thereby depressing the valve member 13 against the effect of its spring 14 and opening the inlet valve.

A rubber gaiter 28 is fixed to the lower end of the member 9 and to a nut on the rod 19 to protect the gland 20 against the entry of any gritty or other material, whether the outlet valve is open or closed. For a similar purpose the valve member 13 terminates in a cylindrical skirt 29 of such length that it still overhangs the top of the member 8 when the inlet valve is closed.

The shaft 24 is driven from a motor 30 through reduction gearing 31 and a Geneva pinion 32 which engages a Geneva wheel 33 having four lobes. A suitable speed for the Geneva pinion is 20 R. P. M., giving a complete revolution of the Geneva wheel in 12 seconds.

Since the space inside the housing is to be set into communication in alternation with the vacuum space and with atmosphere, it is necessary to provide for equalisation of the pressure in the housing with that of the space with which it is about to be set in communication. For this purpose a snifting valve is connected at 34 to the housing member 2, the corresponding connection on the valve being shown at 35. The valve body 36 is mounted in a vertical position and has an upper seating 37 and a lower seating 38.

The upper seating 37 is in communication through a connection 39 with the vacuum space in the vessel to be discharged. The lower seating 38 is in communication by four air holes 40 with atmosphere.

A valve rod 41 is movable in the body 36 and carries a metal washer 42 with yieldable washers 43 held on either side thereof to make air tight contact with the seatings 37 and 38. A coil spring 44 urges the rod 41 downwards into the position in which the space within the housing 3 is in communication with the vacuum space in the vessel to be discharged and is cut off from the atmosphere.

The lower end of the rod 41 carries a tappet 45 which is, however, not directly fixed thereto. The rod 41 has a lower part 46 of reduced section and carries a nut 47 screwed against the end of the larger part of the rod. A cap 48 is screwed on to the tappet 45 and is urged downwards against the nut 47 by a coil spring, 49, which bears against the inside of the tappet 45. A space 50 in the tappet below the lower end of the rod 46 makes it possible for the tappet 45 to move upwards against the spring 49 when the upper washer 43 is against the seating 37, thus preventing injury to the washer.

The shaft 24 which carries the Geneva wheel 33 for actuating the two main valves also carries a cam 51 for actuating the snifting valve. The cam 51 consists essentially of two nearly semicircular parts of different diameters, the transition from the larger to the smaller diameter being radial and that from the smaller to the larger diameter having a sufficient slope to permit the follower to ride up it. The follower in this case is the upturned end of a lever 52 pivoted at 53 in the housing part 3. The outer end of the lever 52 makes engagement with the lower end of the tappet 45, so that when the lever 52 is resting on the larger diameter of the cam the tappet 45 is lifted to open the space within the housing to atmosphere.

The Geneva wheel 33 and the cam 51 are so set on the shaft 24 as to give the timing of various operations which will now be set out in terms of the angular movement of the Geneva wheel 33. It will be noted that just before the start of each 90° there will be a dwell due to the circular part of the Geneva pinion engaging the respective concave part of the Geneva wheel, so that the times during which the various valves are fully open or closed are considerably longer than proportionality with the angles would indicate. At the start of the cycle the snifting valve has already opened the inside space to atmosphere and the outlet valve starts to open, the positions being reckoned from this point.

0° outlet valve starts to open.
60° outlet valve fully opened.
150° outlet valve starts to close.
170° outlet valve closed.
180° snifting valve snaps fully open to vacuum.
190° inlet valve starts to open.
240° inlet valve fully opened.
330° snifting valve starts to close to vacuum and inlet valve starts to close.
347½° inlet valve closed.
355° snifting valve completely closed to vacuum space.
360° next cycle starts as at 0°.

What is claimed is:
1. A valve arrangement for the discharge of loose material from a vacuum space to atmosphere space for fixing to the bottom outlet of a vessel containing the vacuum space, comprising a housing for attachment in a substantially air tight manner to the said outlet and also having a bottom outlet, an inlet valve at the upper part of the housing effective when open to establish communication for the material between the vacuum space and the space within the housing, an outlet valve at the lower part of the housing effective when open to establish communication for the material between the housing and the atmosphere space, a two-way snifting valve, a connection between the snifting valve and the housing, connections between the two ways of the snifting valve and the vacuum space and atmosphere space respectively, first operating means to open and close the inlet and outlet valves in alternation with a period of time after each valve is closed before the other commences to open, second operating means for the snifting valve coupled to the first operating means to place the snifting valve in the said period of time in a position in which it connects the space within the housing to the space to which the inlet and outlet valve respectively is about to open.

2. A valve arrangement as defined in claim 1, in which the inlet and outlet valves each comprise a conical valve member, a resilient ring to constitute a valve seating, and a spring to urge the valve upwards to its closed position.

3. A valve arrangement as defined in claim 1, in which a Geneva drive is included in the operating means for the several valves.

4. A valve arrangement as defined in claim 1, including a cylindrical valve body mounted within the housing to carry the inlet and outlet valves, an annular space being provided between the valve body and the housing for the passage of the material.

5. A valve arrangement as defined in claim 4, in which the moving element of the inlet valve includes a skirt overhanging the valve body in all positions of the valve.

6. A valve arrangement as defined in claim 4, in which a flexible sleeve is attached by its two ends to the relatively moving parts of the outlet valve.

References Cited in the file of this patent
UNITED STATES PATENTS

| | | |
|---|---|---|
| 176,782 | Greiner | May 2, 1876 |
| 435,489 | Ferguson | Sept. 2, 1890 |
| 476,760 | Panchaud et al. | June 7, 1892 |
| 754,216 | Hentgen | Mar. 8, 1904 |
| 2,070,107 | Allen | Feb. 9, 1937 |
| 2,527,250 | Goldberg | Oct. 24, 1950 |